United States Patent [19]

Covey

[11] Patent Number: 4,727,451

[45] Date of Patent: Feb. 23, 1988

[54] METALLIC CONDUCTION METHOD AND SYSTEM FOR JOINED SECTIONS OF COMPOSITE STRUCTURES

[75] Inventor: James H. Covey, Snohomish, Wash.

[73] Assignee: The Boeing Company, Seattle, Wash.

[21] Appl. No.: 926

[22] Filed: Jan. 6, 1987

[51] Int. Cl.⁴ .............................................. H05F 1/02
[52] U.S. Cl. .................................. 361/218; 244/1 A; 174/2; 428/922
[58] Field of Search ............... 361/215, 216, 217, 218; 244/1 A; 174/2, 85; 428/922

[56] References Cited

U.S. PATENT DOCUMENTS 3,755,713  8/1973  Paszkowski ......................... 361/218
4,448,838  5/1984  McClenahan .................... 428/922 X
4,479,163  10/1984  Bannink ............................ 361/218
4,502,092  2/1985  Bannink ............................ 361/218

Primary Examiner—L. T. Hix
Assistant Examiner—Brian W. Brown
Attorney, Agent, or Firm—Seed and Berry

[57] ABSTRACT

A method for protecting composite structures from electrostatic discharge. This method includes limiting resistive heating in conductivity enhanced layers of composite material to prevent delamination due to pyrolytic reactions. Only sufficient metal is used in external conductivity enhanced layers to cause dielectric breakdown to occur before delamination due to pyrolytic reaction results.

5 Claims, 2 Drawing Figures

METALLIC CONDUCTION METHOD AND SYSTEM FOR JOINED SECTIONS OF COMPOSITE STRUCTURES

DESCRIPTION

1. Technical Field

The present invention relates to methods for protecting composite structures from electrostatic discharges. Specifically, the invention relates to a methood for protecting composite aircraft structures which are subject to Zone 1 and Zone 2 ligntning strikes.

2. Background Art

It is known that the composite structural components used on aircraft are subjected to natural lightning strike discharges. The most severe strikes are directed toward small-radius structures located at or near extending surfaces of the aircraft (wing tips, stabilizer tips, vertical tips, rudder, elevators, ailerons, engine cowlings, etc.). These locations are designated as "Zone 1" and are subjected to the initial attachment of the lightning channel. The initial attachment lightning stroke is characterized by a fast-rise, high-peak current ($2 \times 10^5$ amps) and a large energy transfer ($2 \times 10^6$ amps$^2$ sec). It can create severe structural damage to unprotected composite structures (much more damage than to comparable aluminum structures).

Other parts of the structure will be subjected to lesser discharges, clled "swept stroke lightning." These areas are designated as "Zone 2" and are located aft of the original attachment points. Swept stroke lightning also contains a fast-rise current, but with a $1 \times 10^5$ amp peak and an energy transfer of $0.25 \times 10^6$ amps$^2$ sec.

Representative of the use of lightning protection systems in the prior art literature are U.S. Pat. Nos. 3,755,713; 4,479,163; and 4,502,092, assigned to The Boeing Company. Knitted wire mesh is utilized in the lightning protection system of U.S. Pat. No. 3,755,713, in contrast to the preferred embodiments of U.S. Pat. Nos. 4,479,163 and 4,502,092, which utilize nickel-plated graphite fibers. U.S. Pat. No. 3,755,713 shows a decorative layer of knitted wire mesh.

U.S. Pat. Nos. 4,479,163 and 4,502,092 each disclose an integral lightning protection system for composite aircraft skins. In these systems, the graphite epoxy skin is covered by a nickel-plated graphite epoxy fabric comprising individual nickel-plated graphite fibers which are woven into the outer layer of fabric on the structural components requiring protection. Depending upon the protection desired (for Zone 1 or Zone 2), a varying percentage of the fiber tows in both the warp and fill direction of the fabric can be plated (for example, every second tow or every third tow).

The quantity of metal used per unit area on the surface of graphite epoxy skin (particularly for aircraft) which is sufficient to provide satisfactory lightning protection is not well known. Previously, surface area metal densities in excess of 200 g/m$^2$ have been used in the outermost graphite epoxy fabric layer regardless of whether the protected structure was in Zone 1 or Zone 2.

It is known, however, that where insufficient metal density is present, severe delamination or explosion of the composite structure can occur. The use of unnecessary excess metal to protect such composite structures is particularly disadvantageous on commercial and military aircraft where weight reduction is particularly desirable for economy and performance.

DISCLOSURE OF THE INVENTION

It is an object of the present invention to provide composite structures with enhanced surface conductivity using a minimum of metal material.

It is also an object of the present invention to provide composite structures for aircraft having enhanced surface conductivity while using a minimum of metal material determined by the lightning strike zone in which the composite structure is located.

The invention achieves these and other objects which will become apparent from the disclosure which follows by utilizing only a sufficient density of metal in metalized, fibrous layers to moderat resistive heating in the composite structures, particularly in the area of joints or junctions of the composite layers. The invention produces electrical conduction across an intermediate resin layer at the junction between overlapping sections of the composite structures before any substantially detrimental pyrolysis reaction occurs in the resin layer.

In the preferred embodiment of the invention, up to 200 g/m$^2$ of metal can be provided in the fibrous layers to protect overlapping sections of the composite structures from delamination or explosion due to a Zone 1 lightning strike. In Zone 2 areas, as little as 100 g/m$^2$ of metal can be used in the fibrous layers to prevent substantially detrimental pyrolytic reactions from occurring before conduction occurs in the intermediate resin layer.

The invention can be applied to fiberglass/resin, graphite/epoxy and other composite structures. In addition, the invention can be applied to aircraft, marine vessels and any other structure which employs composite materials and which may be subject to lightning strikes or other severe electrostatic discharges.

BEST MODE FOR CARRYING OUT THE INVENTION

Figure 1:
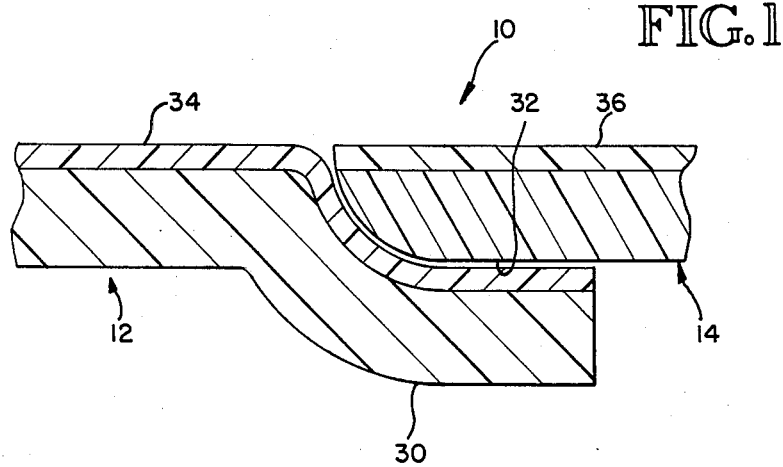
FIG. 1 is an enlarged sectional view of an overlapping section of two composite structures.

An overlapping section of two surface conductivity-enhanced composite structures, such as composite skin materials, in accordance with the present invention, is generally indicated by reference numeral 10. The overlapping section is typical of a seam or joint which may be present on the surface of an aircraft utilizing composite skin materials. The overlapping section is formed by a first composite skin material 12 and a second composite skin material 14.

Figure 2:
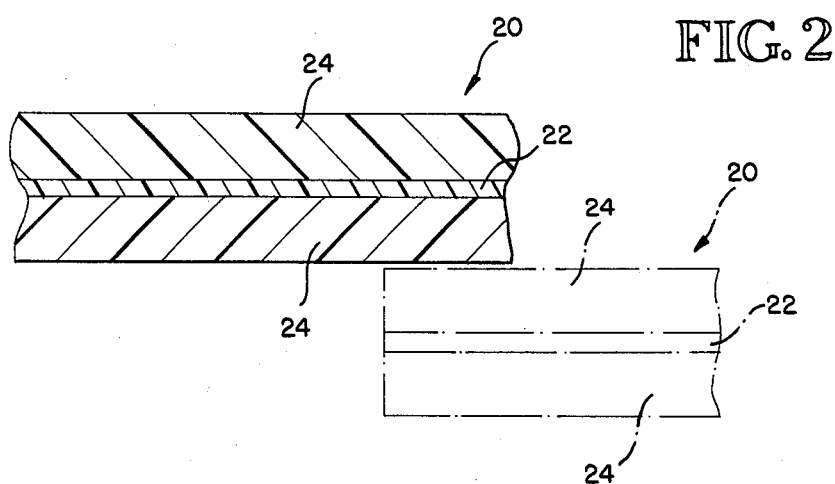
FIG. 2 is an enlarged, partial cross-sectional view of one layer of a composite structure.

The composite skin materials consist of a plurality of fiber/resin layers 20 which are built up to form the skin materials 12, 14. A portion of a single layer is generally indicated at reference numeral 20 in FIG. 2. Each layer consists of a central sheet of woven graphite fabric 22 impregnated with a binding resin 24 which hardnes when cured. The use of woven graphite fabric 22 in an epoxy resin 24 is presently used in aircraft. Polyester fabric in a polyester resin is conventionally used for marine vessels.

The overlapping section 10 shown in FIG. 1 commonly occurs on surfaces of aircraft. The first composite skin material 12 has an underlying section 30 which is adjacent to the bottom 32 of the second composite skin material 14. In the drawing, the two composite skin materials are shown separated for descriptive purposes only. The underlying section 30 and bottom 32 are physcially joined by heating or catalytic reaction to cure the resins in the structures so that the resins external to the woven materials are bonded.

The first and second composite skin materials 12, 14 each have external layers 34, 36, respectively, which are provided with metalized material to enhance the surface conductivity of the composite skin materials. Metal, such as nickel or copper, may be added uniformly to the fabric woven into the external layer by plating individual fiber tows in both the warp and fill directions. In the alternative, the metal may be applied by uniformly plating on the surface directly or plating on woven cloth, tape, or tow which is located on the surface of the external layers.

It has been discovered that the overlapping section 10 is typically one of the sections of the composite skin materials which fails when exposed to lightning discharge. It has been discovered that failure of the overlapping section 10 occurs at the junction of bottom 32 of second composite skin material 14 and the adjacent surface of the external layer 34 of the first composite skin material 12. It has been found that when insufficient metal is present in the external layers 34, 36, a pyrolytic reaction occurs in the binding resin 24 between the metalized woven material of the external layers. The pyrolytic reaction results in the production of expanding gas, which physically separates adjacent layers within the composite skin materials. The pyrolytic reaction can be violent enough to produce sufficient gas to cause the overlapping section 10 to explode within a period of approximately 100 microseconds during a lightning strike. The pyrolytic reaction results from heating in the resin layers because of electrical resistive heating in the metal on the surface or within the external layers 34 and 36. If too litle metal is provided, the resistance heating causes a pyrolytic reaction. The object is to keep the current flowing in the surface of the composite until such time as the current is spread out and therefore reduced in current density before conduction occurs below the surface of the composite. If too much metal is provided, excessive weight and cost result.

In a typical lightning strike, the sequence of events leading to delamination or explosion at an overlapping section 10 is as follows. In the instant of a lightning strike on first composite skin material 12, current flows through the metal in fabric 22 of external layer 34 toward the second composite skin material 14. Resistive heating occurs in the metal of the external layer 34. As current flows toward the overlapping second skin material 14, charge begins to build in the external layer 34, causing a voltage potential across the resin layer between the external layers 34, 36 at the overlapping section 10. If the dielectric breakdown voltage of the resin layer (typically 300–400 volts per mil) is achieved before sufficient pyrolysis occurs to delaminate the layers, the resin layer will begin to conduct and the charge will be dissipated before the pyrolytic reaction destroys the overlapping section 10. If, however, the density of metal in the external layers 34, 36 is insufficient to prevent resistive heating from causing pyrolysis in the resin layer before breakdown voltage is achieved, the layers 20 will delaminate-perhaps with explosive force.

If has been found that a metal density of 200 g/m$^2$ in the woven material 22 of external layers 34 and 36 provides sufficient conductivity in the external layers to moderate resistive heating therein so that breakdown voltage is achieved before pyrolysis delaminates the structures 12, 14 at the overlapping section 10 in a Zone 1 lightning strike.

In aircraft regions where a Zone 2 lightning strike is likely to occur, it has been found that up to approximately 100 g/m$^2$ of metal in the woven material 22 of external layers 34, 36 provides sufficient conductivity in the external layers to prevent delamination of the overlapping section 10 due to pyrolysis.

With graphite epoxy skin materials, it has been found that dielectric breakdown of the epoxy layer will occur within the approximately 100 microseconds duration of the lightning strike. The graphite fibers in fabric 22 become relatively good conductors of electricity above voltages of approximately 1000 volts. the graphite woven fabric has a coefficient of resistivity such that it becomes a better conductor as the fabric heats. This characteristic of graphite complements the opposite conductive behavior of the metal (which has a coefficient of resistivity such that it becomes a poorer conductor with an increase in temperature) in the external layers 34, 36. In this combination, resistive heating is relatively well controlled and dielectric breakdown is achieved well before pyrolytic action generates sufficient gas pressure to delaminate the layers 20, provided that the above densities of the metal are used in the appropriate zones.

Various embodiments of the invention which are not shown are contemplated. For example, the concept of the invention may be utilized with overlapping sections which include fasteners (not shown in FIG. 1). The invention is applicable to any use of composite structure technology. Therefore, the scope of the invention is not to be limited by the above description but is to be determined by the claims which follow.

What is claimed is:

1. A method for protecting an overlapping section of composite skin materials from electrostatic discharges, wherein the composite skin materials are of the type which have a conductivity-enhanced metal layer connected to an external, relatively nonconductive fiber/resin layer so that a relatively nonconductive intermediate resin layer is formed at the overlapping section between the skin materials, comprising the steps of:
   determining the approximate discharge current to which the composite skin materials may be exposed; and
   utilizing only a sufficient density of metal in the metal layer to moderate resistive heating in the composite skin materials so that a breakdown voltage appears across the intermediate resin layer before any substantially detrimental pyrolysis reaction occurs in the resin layer.

2. The method of claim 1 for use in an aircraft wherein the density of metal used is up to 200 g/m$^2$ (two hundred grams per square meter) for protection of composite skin materials exposed to a Zone 1 lightning strike.

3. The method of claim 1 for use in an aircraft wherein the density of metal used is up to 100 g/m$^2$ (one hundred grams per square meter) for protection of composite skin materials exposed to a Zone 2 lightning strike.

4. An integral Zone 1 lightning protection system for an overlapping section of aircraft graphite epoxy composite skin materials, comprising:

a first composite skin material having a conductivity-enhanced, fibrous graphite layer with a distributed metal content of 200 g/m$^2$ (two hundred grams per square meter) in a substantially nonconductive epoxy resin; and a second composite skin material having a conductivity-enhanced fibrous graphite layer with a distributed metal content of 200 g/m$^2$ (two hundred grams per square meter) in a substantially nonconductive epoxy resin, a portion of the second composite skin material overlapping and adhering to the first composite skin material forming an intermediate epoxy resin layer between the conductivity-enhanced fibrous graphite layers, whereby resistive heating in the fibrous layers is moderated and an epoxy resin breakdown voltage appears across the intermediate epoxy resin layer before any substantially detrimental pyrolysis reaction occurs therein.

5. An integral Zone 2 lightning protection system for an overlapping section of aircraft graphite epoxy composite skin materials, comprising:

a first composite skin material having a conductivity-enhanced fibrous graphite layer with a distributed metal content of 100 g/m$^2$ (one hundred grams per square meter) in a substantially nonconductive epoxy resin; and a second composite skin material having a conductivity-enhanced fibrous graphite layer with a distributed metal content of 100 g/m$^2$ (one hundred grams per square meter) in a substantially nonconductive epoxy resin, a portion of the second composite skin material overlapping and adhering to the first composite skin material forming an intermediate epoxy resin layer between the conductivity-enhanced fibrous graphite layers, whereby resistive heating in the fibrous layers is moderated and an epoxy resin breakdown voltage appears across the intermediate epoxy resin layer before any substantially detrimental pyrolysis reaction occurs therein.

* * * * *